United States Patent
Zeineddine et al.

(10) Patent No.: US 12,375,155 B2
(45) Date of Patent: Jul. 29, 2025

(54) INDICATING A BEAM FAILURE DETECTION REFERENCE SIGNAL

(71) Applicant: Lenovo (Singapore) Pte. Ltd., New Tech Park (SG)

(72) Inventors: Khalid Zeineddine, Evanston, IL (US); Vijay Nangia, Woodridge, IL (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 448 days.

(21) Appl. No.: 17/998,853

(22) PCT Filed: May 15, 2021

(86) PCT No.: PCT/IB2021/054178
§ 371 (c)(1),
(2) Date: Nov. 15, 2022

(87) PCT Pub. No.: WO2021/229545
PCT Pub. Date: Nov. 18, 2021

(65) Prior Publication Data
US 2023/0198602 A1 Jun. 22, 2023

Related U.S. Application Data

(60) Provisional application No. 63/025,868, filed on May 15, 2020.

(51) Int. Cl.
*H04W 72/23* (2023.01)
*H04B 7/08* (2006.01)
(Continued)

(52) U.S. Cl.
CPC ............ *H04B 7/088* (2013.01); *H04L 1/0026* (2013.01); *H04W 72/23* (2023.01); *H04W 76/19* (2018.02)

(58) Field of Classification Search
None
See application file for complete search history.

(56) References Cited

U.S. PATENT DOCUMENTS

| | | | |
|---|---|---|---|
| 2022/0095254 A1* | 3/2022 | Zhu | H04L 5/0094 |
| 2022/0295589 A1* | 9/2022 | Tsai | H04B 17/382 |
| 2023/0276519 A1* | 8/2023 | Gao | H04B 7/0695 |
| | | | 370/252 |

FOREIGN PATENT DOCUMENTS

| | | |
|---|---|---|
| EP | 3627721 A1 | 3/2020 |
| WO | 2019193239 A1 | 10/2019 |
| WO | 2019215389 A2 | 11/2019 |

OTHER PUBLICATIONS

PCT/IB2021/054178, "Notification of Transmittal of the International Search Report and the Written Opinion of the International Searching Authority, or the Declaration", International Searching Authority, Aug. 27, 2021, pp. 1-16.

(Continued)

*Primary Examiner* — Robert M Morlan
(74) *Attorney, Agent, or Firm* — Kunzler Bean & Adamson

(57) ABSTRACT

Apparatuses, methods, and systems are disclosed for indicating a beam failure detection reference signal. One method includes determining a first beam failure detection reference signal set and a second beam failure detection reference signal set for a serving cell. The method includes determining a radio link quality of reference signal resource configurations in each of the first beam failure detection reference signal set and the second beam failure detection reference signal set. The method includes indicating an indication of a third beam failure detection reference signal set selected from a group comprising the first beam failure detection reference signal set and the second beam failure detection reference signal set in response to the radio ink (Continued)

quality for all corresponding reference signal resource configurations in the third beam failure detection reference signal set being less than a threshold.

20 Claims, 8 Drawing Sheets

(51) Int. Cl.
*H04L 1/00* (2006.01)
*H04W 76/19* (2018.01)

(56) References Cited

OTHER PUBLICATIONS

ZTE, "Considerations on beam management for multi-TRP", 3GPP TSG RAN WG1 #97 R1-1906244, May 13-17, 2019, pp. 1-7.
3GPP, "3rd Generation Partnership Project; Technical Specification Group Radio Access Network; NR; Requirements for support of radio resource management (Release 16)", 3GPP TS 38.133 V16.3.0, Mar. 2020, pp. 1-1169.
3GPP, "3rd Generation Partnership Project; Technical Specification Group Radio Access Network; NR; Physical layer procedures for control (Release 16)", 3GPP TS 38.213 V16.1.0, Mar. 2020, pp. 1-156.
3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.
3GPP, "3rd Generation Partnership Project; Technical Specification Group Radio Access Network; NR; NR and NG-RAN Overall Description; Stage 2 (Release 16)", 3GPP TS 38.300 V16.1.0, Mar. 2020, pp. 1-133.
3GPP, "3rd Generation Partnership Project; Technical Specification Group Radio Access Network; NR; Medium Access Control (MAC) protocol specification (Release 16)", 3GPP TS 38.321 V16.0.0, Mar. 2020, pp. 1-141.
3GPP, "3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.

* cited by examiner

700

The MAC entity shall for each Serving Cell configured for beam failure detection:
   1> if beam failure instance indication has been received from lower layers:
      2> start or restart the *beamFailureDetectionTimer*;
      2> increment *BFI_COUNTER* by 1;
      2> if *BFI_COUNTER>=beamFilureInstanceMaxCount*:
         3> if the Serving Cell is Scell:
            4> trigger a BFR for this Serving Cell;
         3> else:
            4> initiate a Random Access procedure (see clause 5.1) on the SpCell.

FIG. 7

INDICATING A BEAM FAILURE DETECTION REFERENCE SIGNAL

CROSS-REFERENCE TO RELATED APPLICATIONS

This application claims priority to U.S. Patent Application Ser. No. 63/025,868 entitled "APPARATUSES, METHODS, AND SYSTEMS FOR BEAM FAILURE DECLARATION FOR MULTI-TRP TRANSMISSION WITH PDCCH REPETITION" and filed on May 15, 2020 for Khalid Zeineddine, which is incorporated herein by reference in its entirety.

FIELD

The subject matter disclosed herein relates generally to wireless communications and more particularly relates to indicating a beam failure detection reference signal.

BACKGROUND

In certain wireless communications networks, a reference signal may be used for beam failure detection. In such networks, multi-TRP transmission may also be used.

BRIEF SUMMARY

Methods for indicating a beam failure detection reference signal are disclosed. Apparatuses and systems also perform the functions of the methods. One embodiment of a method includes determining, at a user equipment, a first beam failure detection reference signal set and a second beam failure detection reference signal set for a serving cell. In some embodiments, the method includes determining, at a physical layer in the user equipment, a radio link quality of reference signal resource configurations in each of the first beam failure detection reference signal set and the second beam failure detection reference signal set. In various embodiments, the method includes indicating, to a layer higher than the physical layer of the user equipment, an indication of a third beam failure detection reference signal set selected from a group comprising the first beam failure detection reference signal set and the second beam failure detection reference signal set in response to the radio link quality for all corresponding reference signal resource configurations in the third beam failure detection reference signal set being less than a threshold.

One apparatus for indicating a beam failure detection reference signal includes a processor that: determines a first beam failure detection reference signal set and a second beam failure detection reference signal set for a serving cell; determines, at a physical layer in the user equipment, a radio link quality of reference signal resource configurations in each of the first beam failure detection reference signal set and the second beam failure detection reference signal set; and indicates, to a layer higher than the physical layer of the user equipment, an indication of a third beam failure detection reference signal set selected from a group comprising the first beam failure detection reference signal set and the second beam failure detection reference signal set in response to the radio link quality for all corresponding reference signal resource configurations in the third beam failure detection reference signal set being less than a threshold.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is a logic diagram illustrating one embodiment of a beam failure detection procedure.

DETAILED DESCRIPTION

Figure 1:
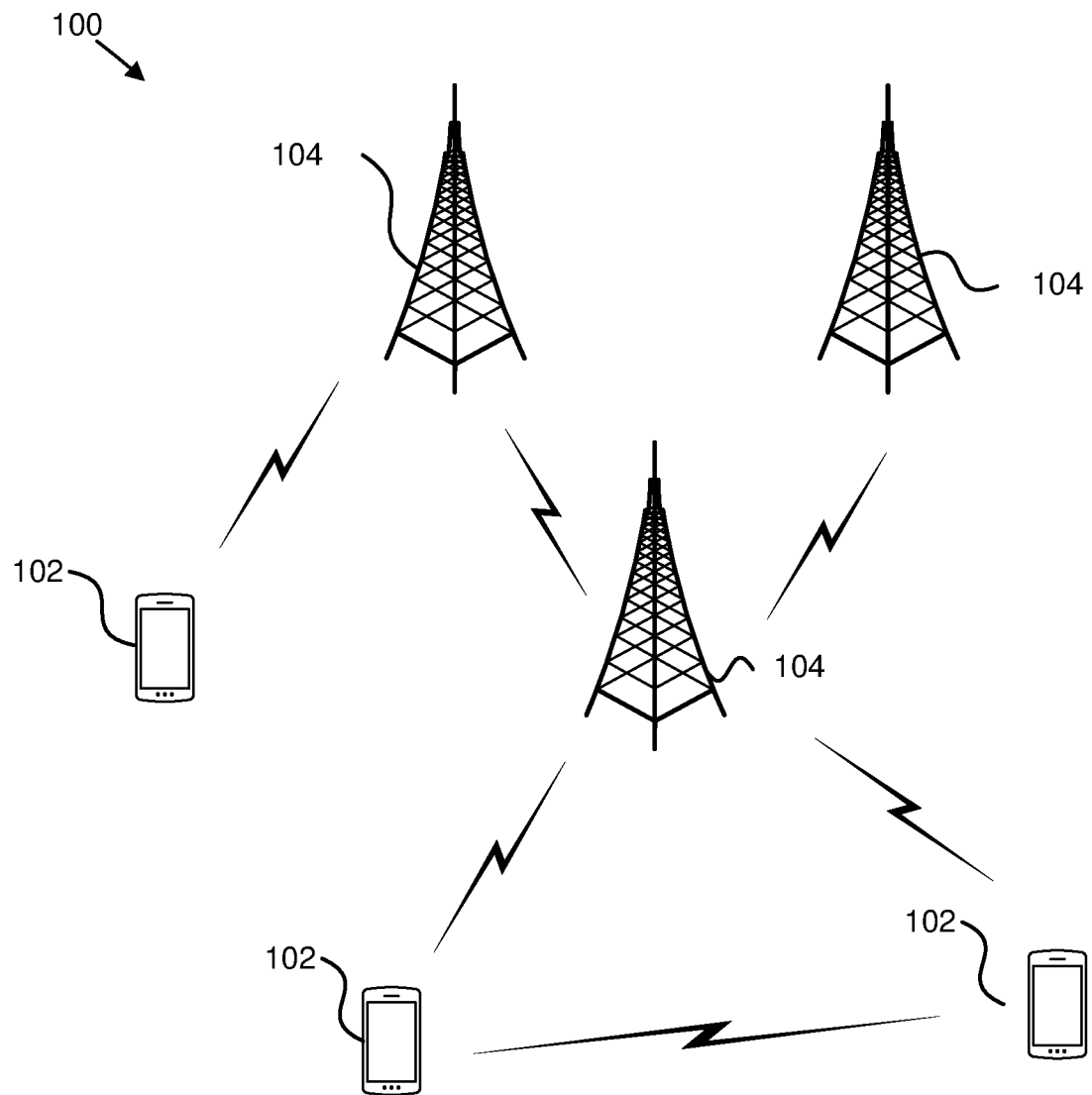
FIG. 1 is a schematic block diagram illustrating one embodiment of a wireless communication system for indicating a beam failure detection reference signal.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for indicating a beam failure detection reference signal. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may determine, at a user equipment, a first beam failure detection reference signal set and a second beam failure detection reference signal set for a serving cell. In some embodiments, the remote unit 102 may determine, at a physical layer in the user equipment, a radio link quality of reference signal resource configurations in each of the first beam failure detection reference signal set and the second beam failure detection reference signal set. In certain embodiments, the remote unit 102 may indicate, to a layer higher than the physical layer of the user equipment, an indication of a third beam failure detection reference signal set selected from a group comprising the first beam failure detection reference signal set and the second beam failure detection reference signal set in response to the radio link quality for all corresponding reference signal resource configurations in the third beam failure detection reference signal set being less than a threshold. Accordingly, the remote unit 102 may be used for indicating a beam failure detection reference signal.

Figure 2:
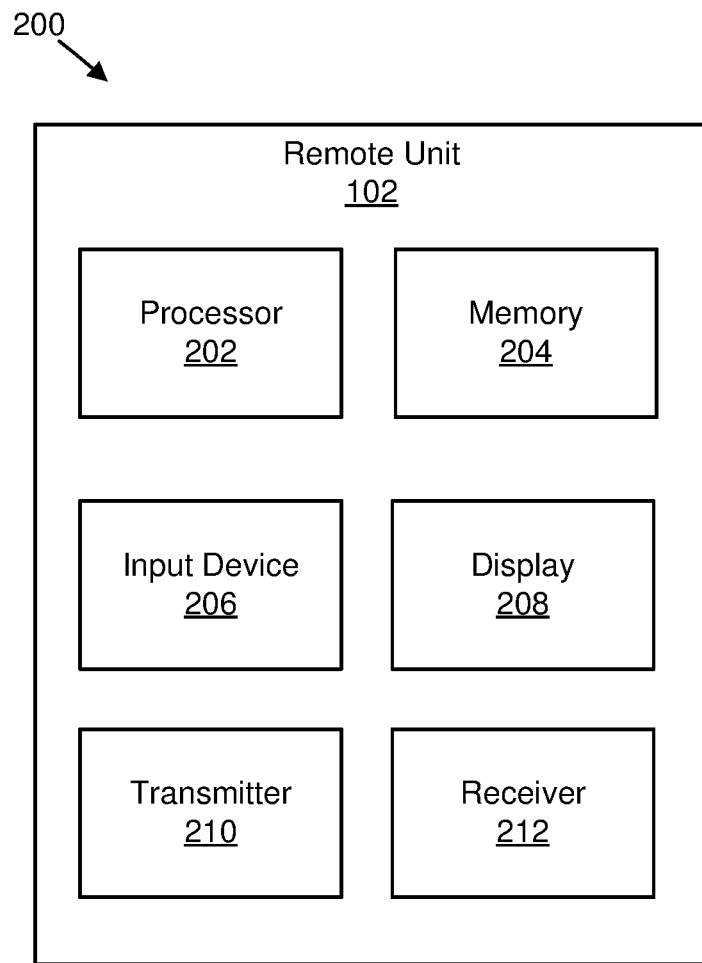
FIG. 2 is a schematic block diagram illustrating one embodiment of an apparatus that may be used for indicating a beam failure detection reference signal.

FIG. 2 depicts one embodiment of an apparatus 200 that may be used for indicating a beam failure detection reference signal. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the processor 202 may: determine a first beam failure detection reference signal set and a second beam failure detection reference signal set for a serving cell; determine, at a physical layer in the user equipment, a radio link quality of reference signal resource configurations in each of the first beam failure detection reference signal set and the second beam failure detection reference signal set; and indicate, to a layer higher than the physical layer of the user equipment, an indication of a third beam failure detection reference signal set selected from a group comprising the first beam failure detection reference signal set and the second beam failure detection reference signal set in response to the radio link quality for all corresponding reference signal resource configurations in the third beam failure detection reference signal set being less than a threshold.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
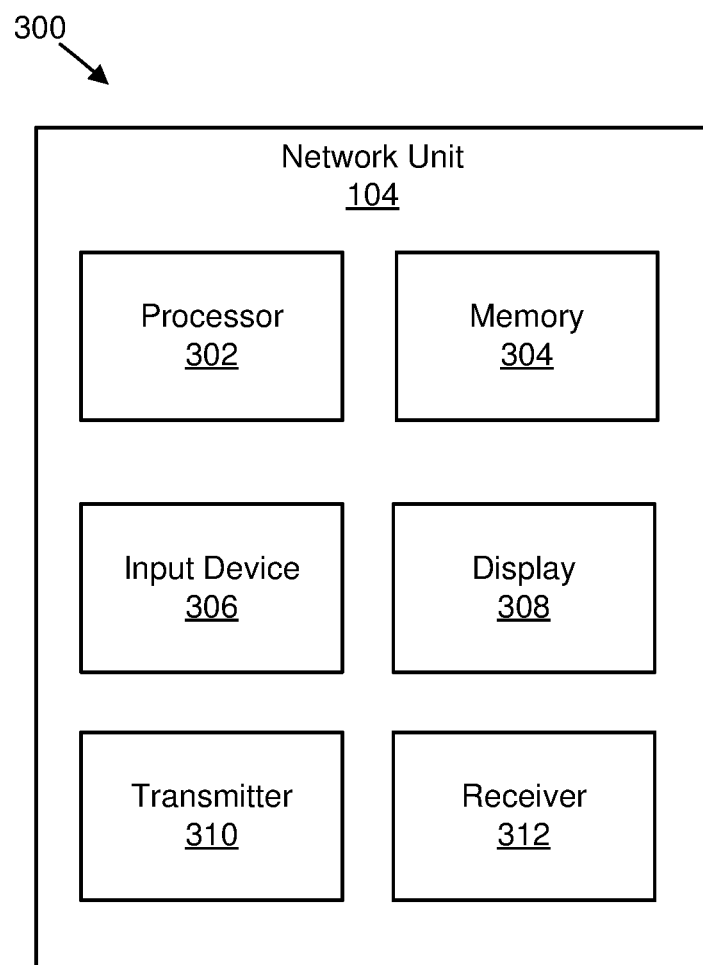
FIG. 3 is a schematic block diagram illustrating one embodiment of an apparatus that may be used for indicating a beam failure detection reference signal.

FIG. 3 depicts one embodiment of an apparatus 300 that may be used for indicating a beam failure detection reference signal. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, such as for FR2, one phenomenon affecting reliability of ultra-reliable low-latency communication ("URLLC") transmissions is radio frequency ("RF") blockage. RF blockage may be caused by moving objects that cause a sudden drop in signal strength at a receiver. One example of this is a factory setting where blockage and reflections by fast moving metal objects, such as cranes and conveyor belts, might cause up to an 11 dB sudden drop in signal strength. In some embodiments, such as in NR, a link between a gNB and a UE is recovered using beam failure detection and recovery procedures.

In various embodiments, unlike other types of diversity (e.g., time, frequency, micro spatial diversity, and so forth), multiple transmission and reception point ("TRP") ("multi-TRP") URLLC transmission may offer angular diversity that is effective against RF blockage, where a UE may still receive a signal from one TRP despite a link from another TRP being blocked.

In certain embodiments, a reliability of a physical downlink shared channel ("PDSCH") channel may be enhanced. In such embodiments, space division multiplexing ("SDM"), frequency division multiplexing ("FDM"), and time domain multiplexing ("TDM") based intra-slot transport block ("TB") repetition (e.g., single downlink scheduling downlink control information ("DCI")) for multi-TRP URLLC transmission may be used.

Figure 4:
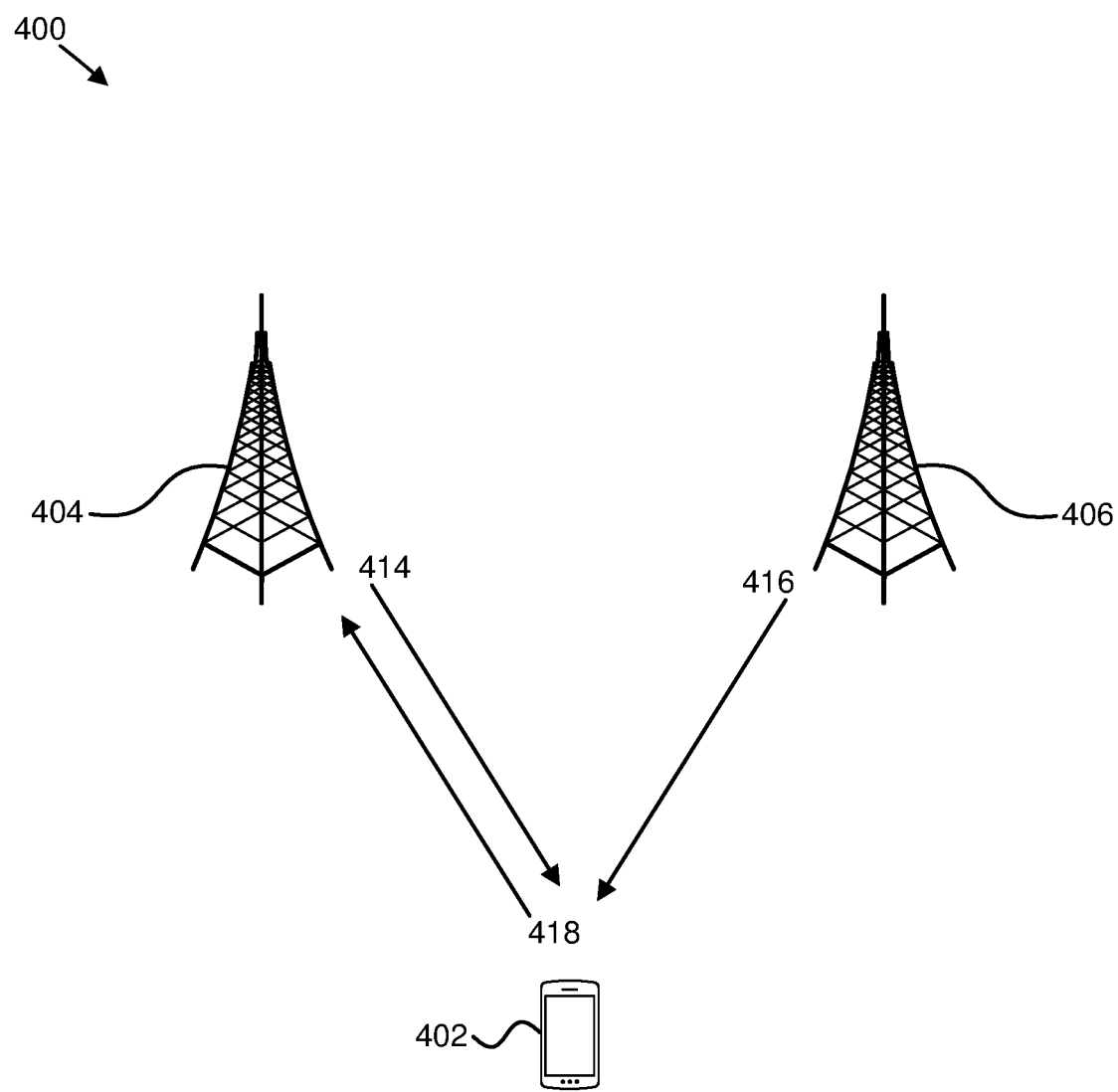
FIG. 4 is a schematic block diagram illustrating one embodiment of TB repetition for multi-TRP URLLC transmission (e.g., single DCI scheduling)

FIG. 4 is a schematic block diagram 400 illustrating one embodiment of TB repetition for multi-TRP URLLC transmission (e.g., single DCI scheduling). The diagram 400 includes a UE 402, a first TRP 404 (TRP A), and a second TRP 406 (TRP B). In FIG. 4 a single scheduling DCI is sent from TRP A 404, while two scheduled PDSCH transmission occasions are sent from TRP A 404 and TRP B 406 to the UE 402. This is accomplished with a physical downlink control channel ("PDCCH") transmission and a first PDSCH transmission 414, and a second PDSCH transmission 416. The UE 402 transmits uplink control information ("UCI") e.g., acknowledgement responses to these PDSCH transmissions with a physical uplink control channel ("PUCCH") transmission and/or transmissions with uplink shared data with a physical uplink shared channel ("PUSCH") transmission 418.

Figure 5:
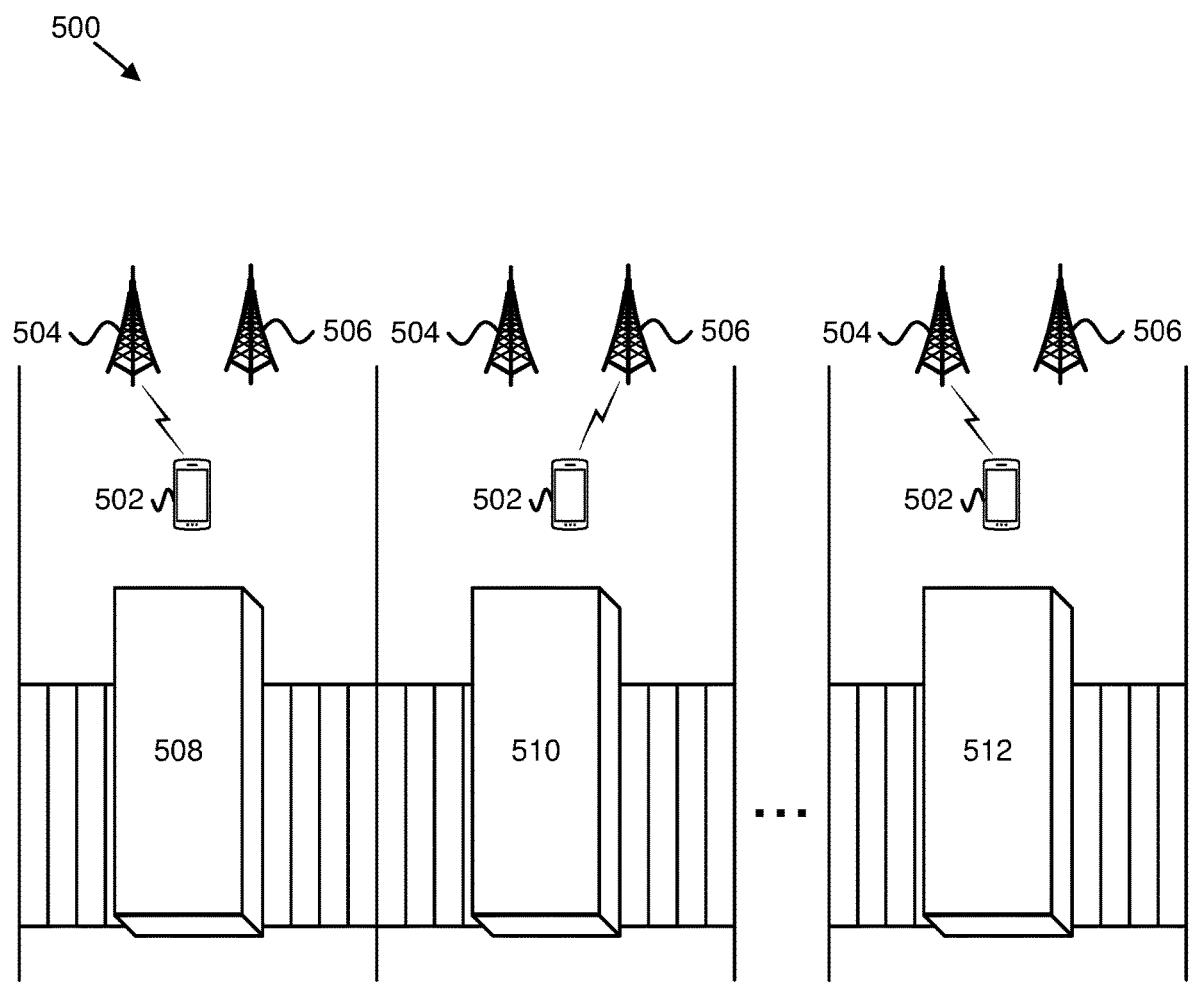
FIG. 5 is a timing diagram illustrating one embodiment of TDM scheme B with cyclical TCI mapping.

In some embodiments, an inter-slot TDMed TB repetition scheme for multi-TRP URLLC may be used through which transmission occasions are transmitted across slots (e.g., up to 16 slots with cyclical or sequential TCI mapping as shown in FIG. 5). Such a scheme may be referred to as TDM scheme B (or TDMSchemeB).

FIG. 5 is a timing diagram 500 illustrating one embodiment of TDM scheme B with cyclical TCI mapping. The diagram 500 illustrates communication between a UE 502, a first TRP 504 (TRP A), and a second TRP 506 (TRP B). During a slot j 508 a first PDSCH repetition is transmitted from the first TRP 504 to the UE 502, during a slot j+1 510 a second PDSCH repetition is transmitted from the second TRP 506 to the UE 502, and so forth to a slot j+N 512 (e.g., N≤16) in which the first TRP 504 transmits a PDSCH repetition N to the UE 502.

In various embodiments, multi-TRP transmission can may be used to improve the reliability and robustness for channels other than PDSCH (e.g., PDCCH, PUSCH, and PUCCH).

Figure 6:
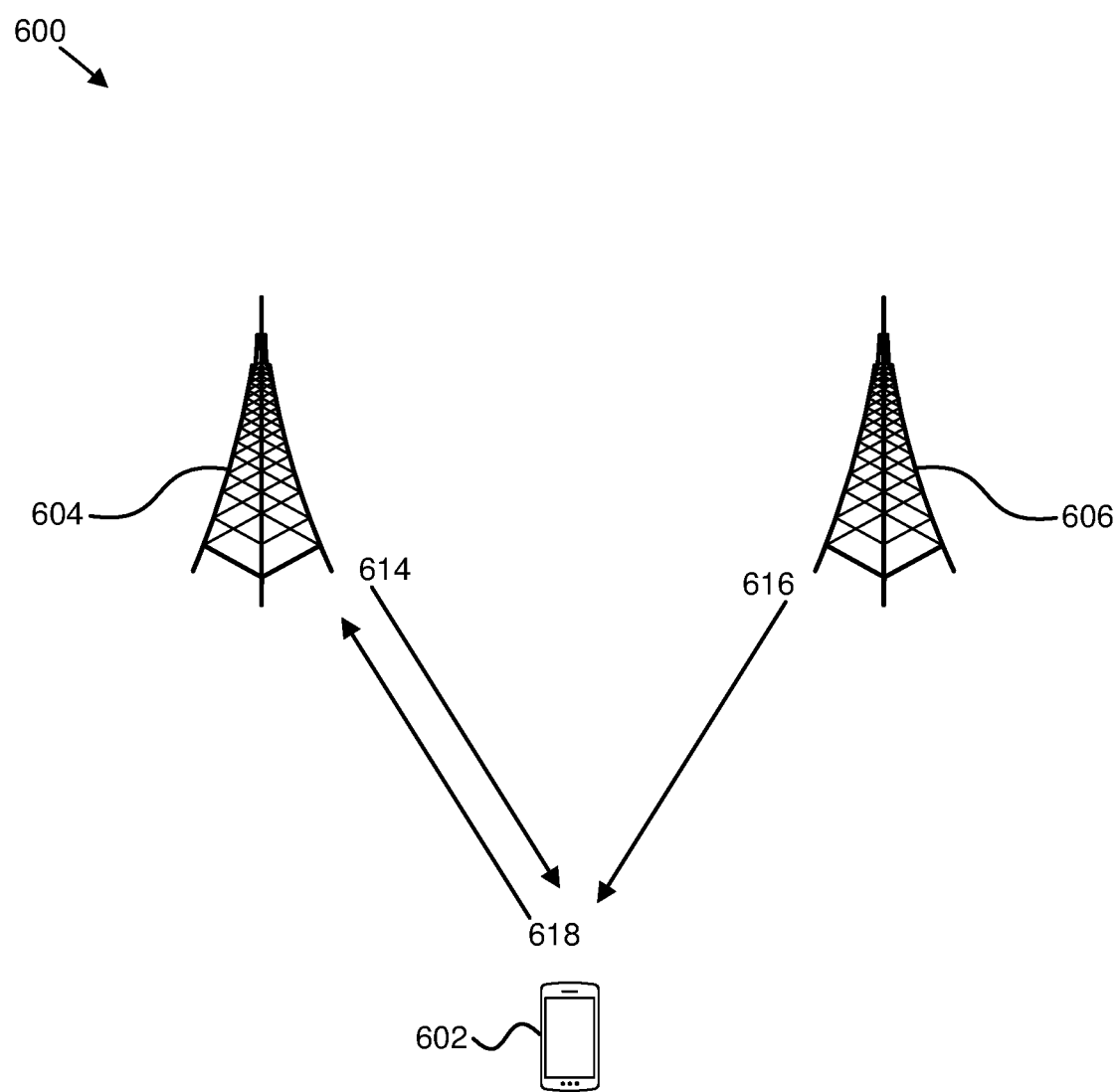
FIG. 6 is a schematic block diagram illustrating one embodiment of PDCCH repetition for multi-TRP URLLC enhancement.

FIG. 6 is a schematic block diagram 600 illustrating one embodiment of PDCCH repetition for multi-TRP URLLC enhancement. The diagram 600 includes a UE 602, a first TRP 604 (TRP A), and a second TRP 606 (TRP B). To improve the robustness of a PDCCH, a scheduling DCI may be repeated from two TRPs involved in a multi-TRP transmission. This is accomplished with a first PDCCH transmission and a first PDSCH transmission 614, and a second PDCCH transmission and a second PDSCH transmission 616. The UE 602 transmits UCI e.g., acknowledgement responses to these transmissions with a PUCCH transmission and/or transmissions with uplink shared data with a PUSCH transmission 618. The second transmission of the DCI may carry the same content as the first DCI, because both DCIs indicate the same PDSCHs. A transmission configuration indicator ("TCI") state for a PDCCH demodulation reference signal ("DM-RS") may differ from TRP A 604 to TRP B 606. Moreover, the PDCCH from TRP A 604 may be sent on control resource set ("CORESET") belonging to a CORESET group and/or pool index 0 (TRP A 604), and the PDCCH from TRP B 606 may be sent on CORESET belonging to CORESET group index 1 (TRP B 606). More than two CORESET groups for more than two TRPs may be used.

In certain embodiments, for PDCCH DM-RS in a CORESET, an antenna port quasi-co-location ("QCL") configuration may be made on a per-CORESET basis. In such embodiments, this may imply that for different TCI states, it may be necessary to have different CORESETs and search space configurations corresponding to different received beams. Moreover, in some embodiments, such as in NR for beam failure detection, a UE uses a beam failure detection ("BFD") reference signal ("RS") ("BFD-RS") to evaluate a quality of a link. In such embodiments, with BFD-RS being periodical channel state information ("CSI") reference signals ("CSI-RSs") that are quasi co-located with a PDCCH DM-RS (e.g., a BFD-RS can be a synchronization signal block ("SSB") for an initial bandwidth part ("BWP")). Moreover, in such embodiments, a quality of each BFD-RS may be individually compared with a threshold (e.g., $Q_{out\_LR}$) that maps to a 10% block error ratio ("BLER") of a hypothetical PDCCH transmission. In various embodiments, a bad frame indicator ("BFI") may be provided to medium access control ("MAC") layer if a quality of all configured BFD reference signals are below a configured threshold (e.g., $Q_{out\_LR}$). In certain embodiments, if downlink control information ("DCI") is carried on PDCCHs from different CORESET groups, a UE may need to know how to detect beam failure and on which groups. This may be especially important for inter-slot TDMed TB repetition scheme for multi-TRP, such as TDMSchemeB, where beam failure detection is crucial for the UE to update the TCI states which the repetitions are sent on.

In some embodiments, there may be a method in a UE device to: 1) configure a BFD-RS set per CORESET group for which a MAC layer keeps a BFI counter; 2) indicate a beam failure a) as a function of BFI counters associated with every CORESET group, b) or when BFD-RSs (e.g., radio resource control ("RRC") configured) linked to only one CORESET group fall below a threshold and a corresponding BFI counter reaches a configured network value; and/or 3) in the event of one link failing that does not raise a beam failure, a UE uses PUSCH and/or PUCCH to inform a gNB about a quality of the beam.

In certain embodiments, a fifth generation ("5G") wireless system is designed to provide connectivity for a wide range of applications. 5G NR design may consider three different service categories: enhanced mobile broadband ("eMBB") addressing human-centric use cases for access to multimedia content, services and data; massive machine type communications ("mMTC") for a very large number of connected devices typically transmitting a relatively low volume of non-delay-sensitive data; and URLLC with strict requirements in terms of latency and reliability. This may be aligned with international telecommunication union ("ITU") requirements.

In various embodiments, a performance target for URLLC transmission for control plane latency is 10 ms, and it is 0.5 ms for user plane latency for downlink and uplink directions, separately. In such embodiments, a mobility interruption time is 0 ms for both intra-frequency and inter-frequency handovers for intra-NR mobility. Reliability may be defined as success probability of transmitting a predefined number of bytes within a certain delay. The requirement for reliability may depend on s usage scenario. For example, a target reliability for URLLC may be 99.999% with a user plane latency of 1 ms and a payload size of 32 bytes.

In certain embodiments, multiple TRP transmissions may be used for reliability enhancements for URLLC services in both frequency range 1 ("FR1") and frequency range 2 ("FR2"). Moreover, Spatial diversity gain may be achieved by jointly transmitting different redundancy versions of data packets or control information, where they are soft combined by a UE at a physical layer.

In some embodiments, a single-DCI multiple-PDSCH scheme may be: 1) an SDM-based scheme where two PDSCHs overlap in time and frequency within one slot; 2) two FDM-based schemes where the two PDSCHs overlap in time and are non-overlapped in frequency within one slot; 3) an intra-slot TDM-based scheme where the two PDSCHs have a time granularity of mini-slot and are transmitted within one slot (e.g., TDMSchemeA); and 4) an inter-slot TDM-based scheme where the PDSCHs carrying different data versions are transmitted across slots (e.g., TDMSchemeB).

In various embodiments, for TDMSchemeB: 1) every transmission occasion of a TB has one TCI state and one redundancy version ("RV")—RV and TCI may be same or different across transmission occasions—the maximum number of TCI states used for all repetitions may be two; 2) two types of mapping from a TCI state to a PDSCH transmission occasion—cyclical mapping and sequential mapping are both used and switched by RRC signaling—all transmission occasions use the same modulation and coding scheme ("MCS") and the same demodulation reference signal ("DMRS") ports—the DMRS ports belong to one code division multiplexing ("CDM") group; 3) all transmission occasions have the same frequency domain resource allocations—all transmission occasions have the same number of consecutive symbols scheduled—the same value of start and length indicator value ("SLIM") is applied to all transmission occasions; and 4) the number of transmission occasions is indicated by an extra field (e.g., RepNumR16) inside the PDSCH-TimeDomainResourceAllocation. Values of RepNumR16={2, 3, 4, 5, 6, 7, 8, 16} may be used.

In certain embodiments, there may be enhancement on the support for multi-TRP deployment, targeting both FR1 and FR2, including: 1) identify and specify features to improve reliability and robustness for channels other than PDSCH (e.g., PDCCH, PUSCH, and PUCCH) using multi-TRP and/or multi-panel; 2) identify and specify QCL and/or TCI-related enhancements to enable inter-cell multi-TRP operations, assuming multi-DCI based multi-PDSCH reception; 3) evaluate and/or specify beam-management-related enhancements for simultaneous multi-TRP transmission with multi-panel reception; and 4) enhancement to support high speed train ("HST") single frequency network ("SFN") deployment scenario: a) identify and specify solutions on QCL assumption for DMRS (e.g., multiple QCL assumptions for the same DMRS ports targeting DL-only transmission; and b) evaluate and/or specify QCL and/or QCL-like relation (e.g., including applicable types and the associated requirement) between downlink ("DL") and uplink ("UL") signal by reusing a unified TCI framework In some embodiments, to improve robustness of a PDCCH transmission, a scheduling DCI may be repeated from two TRPs involved in a multi-TRP transmission. However, for PDCCH DM-RS in a CORESET, an antenna port QCL configuration may be on a per-CORESET basis. For single TRP transmission, beam indication for PDCCH may be done by assigning a subset of M configured candidate TCI states via RRC signaling to each configured CORESET. Using MAC signaling, a network may dynamically indicate a TCI state for receiving a PDCCH of a certain CORESET by sending a TCI state indication for UE-specific PDCCH MAC control element ("CE"). Each device may monitor several PDCCHs, typically once per slot, although it is possible to configure more frequent monitoring to support traffic requiring very low latency. The PDCCH transmissions may be transmitted in one or more CORESETs each of length one to three OFDM symbols. This may imply that for different TCI states, it may be necessary to have different CORESETs and search space configurations corresponding to different received beams.

In various embodiments, such as for multi-DCI based multi-TRP, a PDCCH configuration may be enhanced to increase a maximum number of CORESETs per PDCCH configuration to 5 (e.g., from 3) and a total maximum number of CORESETs across all BWPs per serving cell to 16 (e.g., from 12). In certain embodiments, a parameter (e.g., CORESETPoolIndex) is used to associate a CORESET with an index value (e.g., with either 0 or 1). If a UE is configured with the parameter, the UE may expect to receive multiple PDCCHs from multiple TRPs. The maximum number of monitored PDCCH candidates and non-overlapped channel control elements ("CCEs") corresponding to a CORESET group (e.g., with the same index) may be predetermined. In some embodiments, for monitoring two PDCCH transmissions, a number of CCEs or blind decodes may be higher than in other embodiments. If no index is assigned to a CORESET, then a UE may assume an index value "0" is assigned to that CORESET. As may be appreciated, one of the benefits of CORESET grouping is that it allows association between CORESETs and corresponding TRPs.

In various embodiments, beam management may be a set of layer 1 ("L1") and layer 2 ("L2") procedures for determining a set of beams that are used by a transmitter and receiver to transmit control and data channels. Beam management may include beam determination, beam measurement, and beam reporting. For downlink, beam measurements may be done using SSBs and CSI-RSs.

In certain embodiments, for downlink, beam determination may include a set of procedures called P1, P2, and P3: 1) during the P1 procedure, each TRP transmits synchronization signals (e.g., synchronization signals blocks and/or physical broadcast channel ("SS/PBCH") blocks) on each beam with a whole angular space cover—the UE selects the best beam from a certain TRP along with its reception beam; 2) P2 procedure is used for beam refinement—the CSI-RS has more configuration flexibility and is therefore more appropriate for P2 procedure—this allows gradual adjustment of the gNB transmit ("TX") beam determined by P1; and 3) P3 procedure is used for UE beam refinement—P1 and P2 enable the gNB to change the beams, whereas during the P3 procedure, the gNB transmits on a fixed beam, and the UE performs measurement with different received beams to find the best receive ("RX") beam.

In some embodiments, QCL rules define what properties are shared between the two reference signals: 1) QCL type A: doppler shift, doppler spread, average delay, delay spread; 2) QCL type B: doppler shift, doppler spread; 3) QCL type C: average delay, doppler shift; and 4) QCL type D: spatial Rx parameter (e.g., for FR2 only).

In various embodiments, a TCI framework defines pairs of reference signals used for QCL indication. A TCI state determines which reference signals are used as a QCL source, and what QCL properties may be derived from each reference signal. In cases where QCL Type D is not applicable (e.g., in FR1), a TCI state contains only a single reference signal, and that reference signal provides large-scale channel properties corresponding to QCL Type A, Type B, or Type C. For cases when QCL Type D is applicable (e.g., in FR2), a TCI state contains two reference signals where one of the reference signals provides the large-scale channel properties corresponding to QCL Type A, B, or C, and the second reference signal provides the large-scale channel properties corresponding to QCL Type D. Moreover, all reference signals except the SS/PBCH block and the periodic CSI-RS requires that a valid TCI state is provided.

In certain embodiments, a TCI framework describes how TCI states are signaled to a UE to assist in reception of CSI-RS for CSI acquisition, CSI-RS for beam management, DM-RS for PDCCH demodulation, and DM-RS for PDSCH demodulation. For PDCCH DM-RS, a TCI state may be provided via a combination of RRC and MAC CE. A list of TCI states may be configured in a CORESET. If the list has only a single element, the UE may directly use that TCI state as the source for its PDCCH DM-RS reception. If the list has more than one element, MAC CE may be used to activate one of the TCI states, which the UE uses to receive the PDCCH DM-RS.

In some embodiments, sudden changes in a radio environment may degrade or interrupt a beam-based communication link between a gNB and a UE. To recover connectivity between the UE and the gNB, the BFR procedure may be used, and an alternative link between the UE and gNB may be found for reconnection. BFR may be a combination of L1 and L2 procedures. In BFR, a UE first monitors a radio link by estimating a hypothetical quality of downlink control channels based on a set of periodical reference signals. If the UE has estimated that a quality of a link is not adequate to maintain reliable communication, the UE declares beam failure. After declaring beam failure, the UE initiates recovery to indicate the failure and a new suitable beam to the gNB. In summary it consists of: 1) BFD; 2) new candidate beam identification; 3) BFR request; and 4) recovery response.

In various embodiments, such as for BFD, L1 provides a MAC layer indications of beam failure instances ("BFIs"). The MAC layer may then count the indications, and the MAC layer may declare failure if a configured maximum number of BFI indications has been reached. BFD-RS, on which a UE evaluates a quality of a link, may be configured by a network explicitly using an RRC configuration. BFD-RSs can be SSBs or periodical CSI-RSs that are quasi co-located with a PDCCH DM-RS. SSB-based beam failure detection may be based on an SSB associated to an initial DL BWP and may only be configured for initial DL BWPs and for DL BWPs containing the SSB associated with the initial DL BWP. For other DL BWPs, beam failure detection may only be performed based on CSI-RS. BFD-RS may also be configured implicitly based on activated TCI states for PDCCH reception. For a DM-RS for PDCCH decoding, possible TCI configurations are summarized in Table 1. It should be noted that an SSB block may be a QCL source before a tracking reference signal ("TRS") is configured. For implicit configuration, if a TCI state includes two RSs, the UE selects the RS that is configured with QCL-typeD if the QCL type is configured. Moreover, if the network activates a new TCI state for PDCCH reception, the UE updates the set of RSs used for BFD.

TABLE 1

TCI configurations for DM-RS for PDCCH Decoding

| TCI configuration | DL-RS1 | QCL-type1 | Dl-RS2 (if configured) | QCL-type2 (if configured) |
|---|---|---|---|---|
| 1 | TRS | Type A | TRS | Type D |
| 2 | TRS | Type A | CSI-RS for beam management | Type D |
| 3 | CSI-RS for CSI | Type A | CSI-RS for CSI | Type D |

In certain embodiments, a quality of each BFD-RS may be individually compared against a threshold $Q_{out\_LR}$, which maps to 10% BLER of a hypothetical PDCCH. The threshold $Q_{out\_LR}$ may be defined as a level at which a downlink radio level link of a given resource configuration on set $\bar{q}_0$ cannot be reliably received and may correspond to the $BLER_{out}$=10% block error rate of a hypothetical PDCCH transmission. For SSB based beam failure detection, $Q_{out\_LR\_SSB}$ may be derived based on hypothetical PDCCH transmission parameters. For CSI-RS based beam failure detection, $Q_{out\_LR\_CSI-RS}$ may be derived based on another hypothetical PDCCH transmission parameter. A BFI indication may be provided to a MAC layer if a quality of all configured BFD reference signals is below a configured threshold $Q_{out\_LR}$. If a quality of least one reference signal is above a configured threshold $Q_{out\_LR}$, no failure instance indication may be provided to a MAC layer. The MAC layer uses a BFI counter to count failure indications. When the BFI counter reaches a network configured maximum value, a beam failure may be declared as shown in one embodiment in FIG. 7. Specifically, FIG. 7 is a logic diagram 700 illustrating one embodiment of a beam failure detection procedure.

In some embodiments, after a UE declares beam failure, it initiates a recovery procedure to indicate both beam failure to a gNB and a suitable beam for recovering the failed link. A BFR procedure may reuse a random-access procedure: contention based random access ("CBRA") and contention free random access ("CFRA") mechanisms. In CFRA BFR, a UE may be provided with a list of candidate beams for new beam identification. Each candidate beam (e.g., a downlink reference signal) may be associated with a dedicated CFRA preamble. By transmitting the dedicated preamble, the UE first identifies itself to the gNB, and it also indicates to the gNB both that beam failure has been declared and indicates a new candidate beam for recovery. The new candidate beam may be selected by a MAC layer based on layer 1 ("L1") (e.g., a physical layer) reference signal received power ("RSRP") ("L1-RSRP") measurements provided by a physical layer. On the other hand, a CBRA recovery may be a random access channel ("RACH") procedure where the UE selects one SSB with L1-RSRP above a RSRP threshold (e.g., for CBRA). In a MAC layer, a selection procedure prioritizes candidate beams that may be indicated using dedicated preambles.

In various embodiments, a dedicated CORESET (e.g., CORESET-BFR) may be configured by a network for receiving a network's response to a CFRA BFR request. A gNB response may be scrambled with a cell radio network temporary identifier ("C-RNTI"). A CORESET-BFR may be only monitored if BFR is performed using dedicated signals. If the UE has selected and transmitted a CFRA preamble, the UE monitors the gNB response during a monitoring window. If the UE has successfully received DCI scrambled with its C-RNTI, it may consider the BFR to be successful. After receiving a network response successfully, the UE may continue to monitor PDCCH and PDSCH using a QCL assumption of an indicated candidate beam until a new TCI state for PDCCH is indicated (e.g., activated and/or reconfigured). For the transmission of an uplink control channel, the same spatial filter used for indicating a new candidate beam may be used by a UE until reconfigured by a gNB. On the other hand, CBRA-BFR may be carried out as a normal contention-based RACH procedure. CBRA recovery may work as a fall-back mechanism if CFRA candidates cannot be selected, and also if CFRA recovery is not configured.

In certain embodiments, from a UE perspective, a BFR may be completed successfully if the UE receives a gNB response in CFRA BFR or successfully completes a CBRA procedure. Otherwise, an unsuccessful BFR may lead to the declaration of radio link failure ("RLF") and a subsequent RRC level recovery procedure.

In some embodiments, a UE may be provided, for each BWP of a serving cell, a set $\bar{q}_0$ of periodic CSI-RS resource configuration indexes by failureDetectionResources or beamFailureDetectionResourceList and a set $\bar{q}_1$ of periodic CSI-RS resource configuration indexes and/or SS/PBCH block indexes by candidateBeamRSList or candidateBeamResourceList for radio link quality measurements on the BWP of the serving cell. If the UE is not provided $\bar{q}_0$ by failureDetectionResources or beamFailureDetectionResourceList for a BWP of the serving cell, the UE determines the set $\bar{q}_0$ to include periodic CSI-RS resource configuration indexes with same values as the RS indexes in the RS sets indicated by TCI-State for respective CORESETs that the UE uses for monitoring PDCCH and, if there are two RS indexes in a TCI state, the set $\bar{q}_0$ includes RS indexes with QCL-TypeD configuration for the corresponding TCI states. The UE expects the set $\hat{q}_0$ to include up to two RS indexes. The UE expects single port RS in the set $\bar{q}_0$.

In various embodiments, thresholds $Q_{out,LR}$ and $Q_{in,LR}$ correspond to a default value of rlmInSyncOutOfSyncThreshold for $Q_{out}$, and to the value provided by rsrp-ThresholdSSB or rsrp-ThresholdSSBBFR, respectively.

In certain embodiments, a physical layer in a UE assesses a radio link quality according to the set $\bar{q}_0$ of resource configurations against the threshold $Q_{out,LR}$. For the set $\bar{q}_0$, the UE assesses the radio link quality only according to periodic CSI-RS resource configurations, or SS/PBCH blocks on the primary cell ("PCell") or the primary secondary cell ("PSCell"), that are quasi co-located with the DM-RS of PDCCH receptions monitored by the UE. The UE applies the $Q_{in,LR}$ threshold to the L1-RSRP measurement obtained from a SS/PBCH block. The UE applies the $Q_{in,LR}$ threshold to the L1-RSRP measurement obtained for a CSI-RS resource after scaling a respective CSI-RS reception power with a value provided by powerControlOffsetSS.

In some embodiments, in a non-discontinuous reception ("DRX") mode operation, a physical layer in a UE provides an indication to higher layers if a radio link quality for all corresponding resource configurations in the set $\bar{q}_0$ that the UE uses to assess the radio link quality is worse than the threshold $Q_{out,LR}$. The physical layer informs the higher layers if the radio link quality is worse than the threshold $Q_{out,LR}$ with a periodicity determined by the maximum between the shortest periodicity among the periodic CSI-RS configurations, and/or SS/PBCH blocks on the PCell or the PSCell, in the set $\bar{q}_0$ that the UE uses to assess the radio link quality and 2 msec. In DRX mode operation, the physical layer provides an indication to higher layers when the radio link quality is worse than the threshold $Q_{out,LR}$ with a periodicity.

In various embodiments, for the PCell or the PSCell, upon request from higher layers, the UE provides to higher layers the periodic CSI-RS configuration indexes and/or SS/PBCH block indexes from the set q and the corresponding L1-RSRP measurements that are larger than or equal to the $Q_{in,LR}$ threshold.

In certain embodiments, for the SCell, upon request from higher layers, the UE indicates to higher layers whether there is at least one periodic CSI-RS configuration index and/or SS/PBCH block index from the set $\bar{q}_1$ with corresponding L1-RSRP measurements that are larger than or equal to the $Q_{in,LR}$ threshold, and provides the periodic CSI-RS configuration indexes and/or SS/PBCH block indexes from the set $\bar{q}_1$ and the corresponding L1-RSRP measurements that are larger than or equal to the $Q_{in,LR}$ threshold, if any.

In some embodiments, for the PCell or the PSCell, a UE may be provided a CORESET through a link to a search space set provided by recoverySearchSpaceId for monitoring PDCCH in the CORESET. If the UE is provided recoverySearchSpaceId, the UE does not expect to be provided another search space set for monitoring PDCCH in the CORESET associated with the search space set provided by recoverySearchSpaceId.

In various embodiments, for the PCell or the PSCell, the UE may be provided, by PRACH-ResourceDedicatedBFR, a configuration for PRACH transmission. For PRACH transmission in slot n and according to antenna port quasi co-location parameters associated with periodic CSI-RS resource configuration or with SS/PBCH block associated with index $g_{new}$ provided by higher layers, the UE monitors PDCCH in a search space set provided by recoverySearchSpaceId for detection of a DCI format with CRC scrambled by C-RNTI or MCS-C-RNTI starting from slot n+4 within a window configured by Beam FailureRecoveryConfig. For PDCCH monitoring in a search space set provided by recoverySearchSpaceId and for corresponding PDSCH reception, the UE assumes the same antenna port quasi-collocation parameters as the ones associated with index $q_{new}$ until the UE receives by higher layers an activation for a TCI state or any of the parameters tci-StatesPDCCH-ToAddList and/or tci-StatesPDCCH-ToReleaseList. After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE activation command for a TCI state or tci-StatesPDCCH-ToAddList and/or tci-StatesPDCCH-ToReleaseList.

In certain embodiments, for the PCell or the PSCell, after 28 symbols from a last symbol of a first PDCCH reception in a search space set provided by recoverySearchSpaceId for which the UE detects a DCI format with CRC scrambled by C-RNTI or MCS-C-RNTI and until the UE receives an activation command for PUCCH-SpatialRelationInfo or is provided PUCCH-SpatialRelationInfo for PUCCH resource (s), the UE transmits a PUCCH on a same cell as the PRACH transmission using: 1) a same spatial filter as for the last PRACH transmission; and 2) a power determined as described in Clause 7.2.1 with $q_u=0$, $q_d=q_{new}$, and $l=0$.

In some embodiments, for the PCell or the PSCell, after 28 symbols from a last symbol of a first PDCCH reception in a search space set provided by recoverySearchSpaceId where a UE detects a DCI format with CRC scrambled by C-RNTI or MCS-C-RNTI, the UE assumes same antenna port quasi-collocation parameters as the ones associated with index $g_{new}$ for PDCCH monitoring in a CORESET with index 0.

In various embodiments, a UE may be provided, by schedulingRequestIDForBFR, a configuration for PUCCH transmission with a link recovery request ("LRR"). The UE may transmit in a first PUSCH at least one MAC CE providing one index for at least one corresponding SCell with radio link quality worse than $Q_{out,LR}$, an $index_{new}$ for a periodic CSI-RS configuration or for a SS/PBCH block provided by higher layers, if any, for a corresponding SCell. After 28 symbols from a last symbol of a PDCCH reception with a DCI format scheduling a PUSCH transmission with a same HARQ process number as for the transmission of the first PUSCH and having a toggled NDI field value, the UE: 1) monitors PDCCH in all CORESETs on the SCells indicated by the MAC CE using the same antenna port quasi co-location parameters as the ones associated with the corresponding index(es) $q_{new}$, if any; 2) transmits PUCCH on a PUCCH-SCell using a same spatial domain filter as the one corresponding to $q_{new}$ for periodic CSI-RS or SS/PBCH block reception, and using a power determined as described in Clause 7.2.1 with $q_u=0$, $q_d=q_{new}$, and l=0, if: a) the UE is provided PUCCH-SpatialRelationInfo for the PUCCH; b) a PUCCH with the LRR was either not transmitted or was transmitted on the PCell or the PSCell; and the PUCCH-SCell is included in the SCells indicated by the MAC-CE, where the SCS configuration for the 28 symbols is the smallest of the SCS configurations of the active DL BWP for the PDCCH reception and of the active DL BWP(s) of the at least one SCell.

In certain embodiments, a MAC entity may be configured by RRC per serving cell with a beam failure recovery procedure which is used for indicating to the serving gNB of a new SSB or CSI-RS if beam failure is detected on the serving SSBs and/or CSI-RSs. Beam failure may be detected by counting a beam failure instance indication from lower layers to a MAC entity. If beamFailureRecoveryConfig is reconfigured by upper layers during an ongoing random access procedure for beam failure recovery for SpCell, the MAC entity may stop the ongoing random access procedure and initiate a random access procedure using a new configuration.

In some embodiments, RRC configures the following parameters in the BeamFailureRecoveryConfig and the RadioLinkMonitoringConfig for the beam failure detection and recovery procedure: beamFailureInstanceMaxCount for the beam failure detection; beamFailureDetectionTimer for the beam failure detection; beamFailureRecoveryTimer for the beam failure recovery procedure; rsrp-ThresholdSSB: an RSRP threshold for the beam failure recovery; powerRampingStep: powerRampingStep for the beam failure recovery; powerRampingStepHighPriority: powerRampingStepHighPriority for the beam failure recovery; preambleReceivedTargetPower: preambleReceivedTargetPower for the beam failure recovery; preambleTransMax: preambleTransMax for the beam failure recovery; scalingFactorBI: scalingFactorBI for the beam failure recovery; ssb-perRACH-Occasion: ssb-perRACH-Occasion for the beam failure recovery; ra-ResponseWindow: the time window to monitor responses for the beam failure recovery using contention-free random-access preamble; prach-ConfigurationIndex: prach-ConfigurationIndex for the beam failure recovery; ra-ssb-OccasionMaskIndex: ra-ssb-OccasionMaskIndex for the beam failure recovery; and ra-OccasionList: ra-OccasionList for the beam failure recovery.

In various embodiments, the following UE variable may be used for the beam failure detection procedure: BFI_COUNTER: counter for beam failure instance indication which is initially set to 0.

In certain embodiments, a MAC entity may, for each serving cell configured for beam failure detection: 1) if beam failure instance indication has been received from lower layers: a) start or restart the beamFailureDetectionTimer; b) increment BFI_COUNTER by 1; c) if BFI_COUNTER>=beamFailureInstanceMaxCount: c1) if the serving cell is SCell: trigger a BFR for this serving cell; c2) else: initiate a random-access procedure on the SpCell; 2) if the beamFailureDetectionTimer expires; or 3) if beamFailureDetectionTimer, beamFailureInstanceMaxCount, or any of the reference signals used for beam failure detection is reconfigured by upper layers associated with this serving cell: set BFI_COUNTER to 0; 4) if the serving cell is SpCell and the random-access procedure is successfully completed: a) set BFI_COUNTER to 0; b) stop the beamFailureRecoveryTimer, if configured; c) consider the beam failure recovery procedure successfully completed; 5) else if the serving cell is SCell, and a PDCCH addressed to C-RNTI indicating uplink grant for a new transmission is received for the hybrid automatic repeat request ("HARQ") process used for the transmission of the BFR MAC CE or truncated BFR MAC CE which contains beam failure recovery information of this serving cell; or 6) if the SCell is deactivated: a) set BFI_COUNTER to 0; and b) consider the beam failure recovery procedure successfully completed and cancel all the triggered BFRs for this serving cell.

In some embodiments, a MAC entity may: if the beam failure recovery procedure determines that at least one BFR has been triggered and not cancelled: 1) if uplink shared channel ("UL-SCH") resources are available for a new transmission and if the UL-SCH resources can accommodate the BFR MAC CE plus its subheader as a result of logical channel prioritization ("LCP"): instruct the multiplexing and assembly procedure to generate the BFR MAC CE; b) else if UL-SCH resources are available for a new transmission and if the UL-SCH resources can accommodate the truncated BFR MAC CE plus its subheader as a result of LCP: instruct the multiplexing and assembly procedure to generate the truncated BFR MAC CE; 3) else: trigger the scheduling request ("SR") for SCell beam failure recovery for each SCell for which BFR has been triggered and not cancelled.

In various embodiments, all BFRs triggered prior to MAC PDU assembly for beam failure recovery for a SCell may be cancelled if a MAC PDU is transmitted and this PDU includes a BFR MAC CE or truncated BFR MAC CE that contains beam failure information of that SCell.

In certain embodiments, a UE is configured with multiple CORESET groups and/or pools with each CORESET group and/or pool corresponding to a PDCCH transmission from one TRP. The UE monitors several PDCCHs transmitted on one or more CORESETs, with each CORESET belonging to one of the multiple CORESET groups and/or pools (e.g., to different CORESET groups and/or pools). Every PDCCH may carry a repetition of the same downlink scheduling assignment. The scheduling DCI may be repeated across the monitored PDCCHs to improve reliability and robustness (e.g., for URLLC transmission). Using MAC signaling, a network may dynamically indicate a TCI state for receiving a PDCCH of a certain CORESET by sending the TCI state indication for UE-specific PDCCH MAC CE. The PDCCH DMR-RS on one CORESET may have a different TCI state compared to the PDCCH DM-RS on the other CORESETs (e.g., multi-TRP PDCCH transmission on different beams).

In some embodiments, if a scheduling grant is carried on two or more PDCCHs, each may belong to a different CORESET group. For PDCCHs or CORESETs associated with a CORESET group i; i=1, . . . , N, the UE may determine (e.g., explicitly configured or implicitly) the reference signals QCL'ed with the DM-RS of PDCCH of CORESETs in CORESET group i, as the BFD-RS set associated with this set of TCI states $T_i$ of CORESET group $i_r$. This set may be denoted as $q_0^i$ (i=1, . . . , N). The MAC layer keeps a BFI counter for each $q_0^i$ separately (e.g., a BFI counter per CORESET group). The counter may be denoted as $d_i$ (i=1, . . . , N). Within the set $q_0^i$, a quality of each BFD-RS may be individually compared against a threshold $Q_{out\_LR}$ that maps to a 10% BLER of a hypothetical PDCCH. A BFI indication per CORESET group may be provided to a MAC layer if the quality of all the BFD reference signals in $q_0^i$ are below a configured threshold $Q_{out\_LR}$. If the quality of least one reference signal is above the configured threshold $Q_{out\_LR}$, no failure instance indication is provided to the MAC layer. The MAC layer declares a beam failure depending on BFI counter states ($d_1$, $d_2$, ..., $d_N$), and initiates a recovery procedure to indicate both beam failure to the gNB and a suitable beam for recovering the failed link using an uplink channel (e.g., the random-access procedure: contention based (CBRA) and contention free (CFRA) mechanisms).

In various embodiments, if, however, a BFI counter of any CORESET group reaches a network configured maximum value and beam failure has not been declared (e.g., BFI counters for the other CORESET group not reached the configured maximum value), a UE uses an uplink channel (e.g., PUCCH, PUCCH, and/or PRACH) to separately report a quality of a link for a corresponding CORESET group (e.g., similar to how Scell BFR may be sent using a PUCCH BFR-SR scheduling request) to assist a network in updating a pool of TRPs involved in a multi-TRP transmission.

In certain embodiments, a BFD-RS set on which a UE evaluates a quality of a link is configured by a network explicitly using RRC configuration. The configured BFD-RSs are QCLed with a DMRS of one of the PDCCHs of CORESETs in a CORESET group denoted as 'PDCCH/CORESET group m' (e.g., the set $q_0^m$). In other words, beam failure declaration may depend on only one CORESET group. For every $q_0^i$ (i=1, ..., N), the UE may only monitor the quality of each BFD-RS in $q_0^i$, and individually compare it against the threshold $Q_{out\_LR}$. A BFI indication may be provided to a MAC layer only if a quality of all BFD reference signals belonging to $q_0^i$ is below a configured threshold $Q_{out\_LR}$. However, only if $d_m$, the BFI counter associated with CORESET group m, reaches a network configured maximum value, the MAC layer declares a beam failure and initiates a beam recovery. CORESET group m may resemble a TRP with a strongest signal strength transmitted to the UE. BFI may not be based on sets $q_0^i$ (i=1, ..., n; i≠m). If, however, a BFI counter of any CORESET groups i=1, ..., n; i≠m, reaches a network configured maximum value and beam failure has not been declared, the UE uses an uplink channel (e.g., PUSCH, PUCCH, and/or PRACH) to separately report a quality of a link (e.g., similar to how Scell BFR may be sent using PUCCH BFR-SR scheduling request) to assist a network in updating a pool of TRPs involved in a multi-TRP transmission.

In some embodiments, a threshold $Q_{out\_LR}$ may be defined as a level at which a downlink radio level link of a given resource configuration on set $\tilde{q}_0$ cannot be reliably received and may correspond to the $BLER_{out}$=X % block error rate of a hypothetical PDCCH transmission. In one example, Qout may map to a BLER level other than the 10% BLER level. In another example, a network may configure the BLER target (X) for a Qout threshold for the UE. This may be based on service requirements for the UE (e.g., eMBB, URLLC, or both).

In various embodiments, a UE uses CSI reporting to inform a network about a quality of a link associated with one CORESET group, without waiting for a corresponding BFI counter to reach a network configured maximum value.

In certain embodiments, CORESETs are grouped in to one or more groups or pools with beam failure detection and/or beam failure indication performed independently for each CORESET group and/or pool. A first CORESET group and/or pool may be associated with a first TRP and a second CORESET group and/or pool may be associated with a second TRP. A CORESET may be configured by higher layers to belong to a one of the groups or pools (e.g., by configuring a CORESET pool index for the CORESET). In some embodiments, a UE may be configured with a first list of CORESETs that form a first BFD CORESET pool and a second list of CORESETs that form a second BFD CORESET pool. A first set of RSs for BFD (e.g., set $q_0$) may be determined based on an activated TCI states for PDCCH of all CORESETs in the first BFD CORESET pool and a second set of RSs for BFD (e.g., set $q_0$) are determined based on the activated TCI states for PDCCH of all CORESETs in the second BFD CORESET pool. In such embodiments, the BFD-RSs may be explicitly configured to be SSBs or periodic CSI-RSs that are quasi co-located with the PDCCH DM-RS or configured implicitly based on the activated TCI states for PDCCH monitoring—if a TCI state includes two RSs, the UE selects the RS that is configured with QCL-typeD if the QCL type is configured. The UE physical layer may indicate a BFI indication to a MAC entity (e.g., higher layers) if a quality of all configured BFD reference signals in a CORESET pool is below a configured threshold $Q_{out\_LR}$. The UE physical layer may also indicate an indication of which CORESET pool (e.g., CORESET pool index) to the MAC entity. The physical layer may inform the higher layers if a radio link quality is worse than the threshold $Q_{out,LR}$ with a periodicity that is different for a first CORESET pool and a second CORESET pool. In one embodiment, a minimum periodicity for a first CORESET pool may be a value of 2 ms if the minimum periodicity for a second CORESET pool may be larger than 2 ms and may be configured by the gNB based on higher layer RRC signaling. The MAC entity may maintain separate BFI counters for each of the CORESET pools. The UE may be configured with the same or different values of beamFailureDetectionTimer and/or beamFailureInstanceMaxCount for different CORESET pools. In another embodiment, if a BFI counter for one of the CORESET pools reaches a network configured maximum value, a beam failure may be declared for that CORESET pool. In certain embodiments, a UE indicates to a gNB that beam failure has been declared and a new candidate beam for recovery for a failed CORESET pool using an uplink channel (e.g., PUSCH, PUCCH, and/or PRACH) associated with another CORESET pool that has not failed—e.g., based on beams or spatial filters that have the same spatial relation as that associated with the activated TCI states for PDCCH monitoring (e.g., RS that is configured with QCL-typeD) for a non-failed CORESET pool. In one example, a failed CORESET pool index may be indicated to a gNB. In another example, a UE may transmit, in a first PUSCH, at least one MAC CE providing one index for at least one corresponding CORESET pool with a radio link quality worse than $Q_{out,LR}$ and/or an index $q_{new}$ for a periodic CSI-RS configuration or for a SS/PBCH block provided by higher layers, if any, for a corresponding CORESET pool. In a further example, a UE may be configured with a schedulingRequestIDForBFR-CoresetPool, a configuration for PUCCH transmission with a LRR if a beam failure is declared for a CORESET pool. In yet another example, a UE may be configured with a first configuration for PUCCH transmission with a LRR for a first CORESET pool (e.g., schedulingRequestIDForBFR-CoresetPool1) and a second configuration for PUCCH transmission with a LRR for a second CORESET pool (e.g., schedulingRequestID-ForBFR-CoresetPool2). The gNB may indicate that a BFR is for a certain CORESET pool based on which PUCCH configuration is used for SR-BFR transmission.

In some embodiments, instead of CORESET groups or pools, search space groups (e.g., UE specific search space) may be configured or active TCI states for PDCCH groups may be configured or determined by a UE. In such embodiments, a CORESET may be associated with multiple active TCI states (e.g., corresponding to different TRPs)—for example, a first active TCI state and a second active TCI state. The CORESET with a first active TCI state corresponding to a first TRP occurring at a first time and a second active TCI state corresponding to a second TRP occurring at a second time (e.g., switching TCI states with some periodicity or different search spaces associated with different active TCI states or search space configured with an index (e.g., 0 or 1) to indicate which CORESET active TCI state to use). First active TCI states for a PDCCH group may correspond to a first TCI state of all (or subset) CORESETs and second active TCI states for a PDCCH group may correspond to a second TCI state of all (or subset) CORESETs. Beam failure detection and/or beam failure indication may be performed independently for each active TCI state group. BFD-RS for a group may be associated with a TCI state for PDCCHs within each active TCI state group.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")), or higher than 6 GHz (e.g., frequency range 2 ("FR2") or millimeter wave ("mm-Wave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a device (e.g., UE, node) antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In various embodiments, a transmission configuration indicator ("TCI") state associated with a target transmission may indicate a quasi-collocation relationship between a target transmission (e.g., target RS of demodulation reference signal ("DM-RS") ports of the target transmission during a transmission occasion) and source reference signals (e.g., synchronization signal block ("SSB"), channel state information reference signal ("CSI-RS"), and/or sounding reference signal ("SRS")) with respect to quasi co-location type parameters indicated in a corresponding TCI state. A device may receive a configuration of multiple transmission configuration indicator states for a serving cell for transmissions on the serving cell.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

Figure 8:
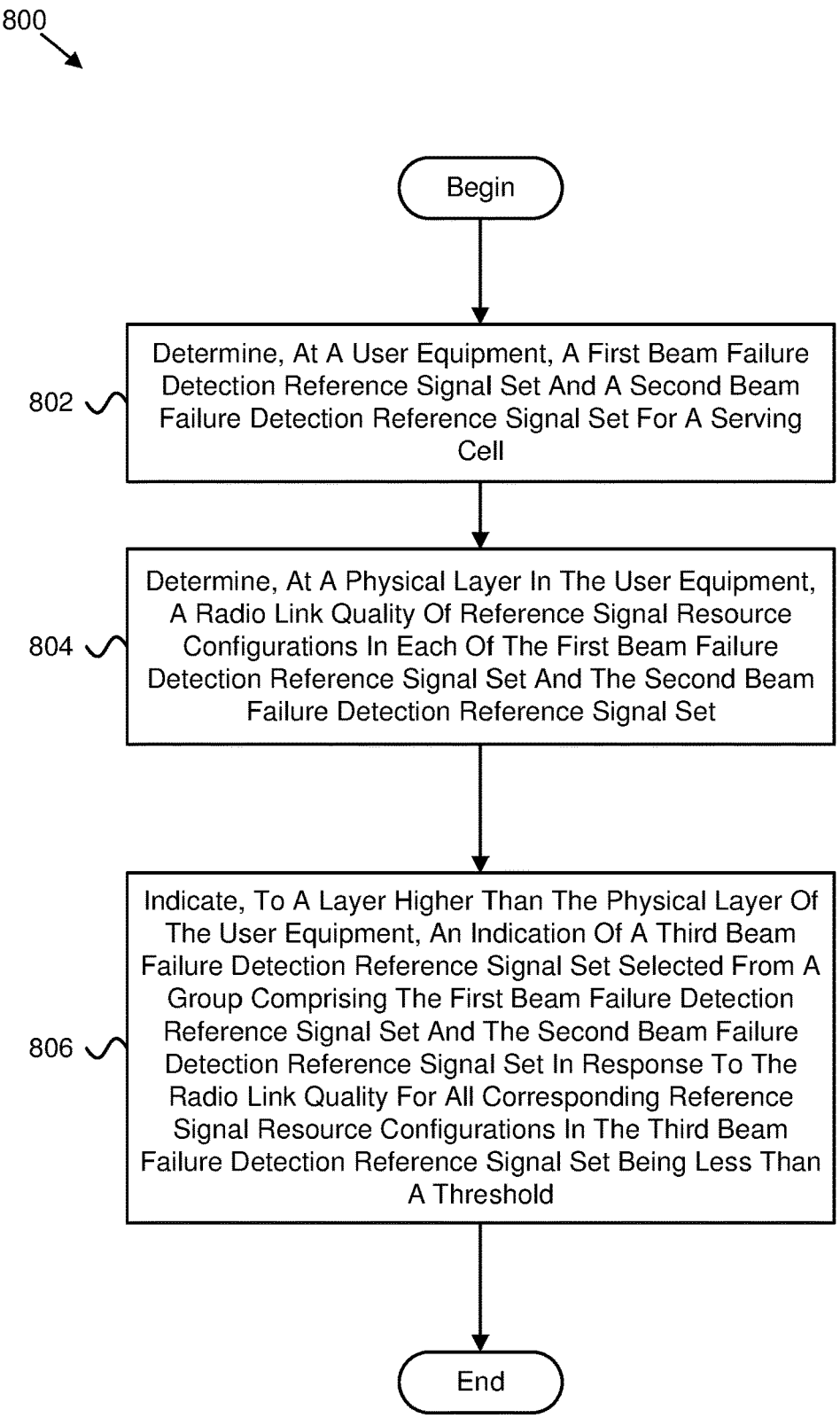
FIG. 8 is a flow chart diagram illustrating one embodiment of a method for indicating a beam failure detection reference signal.

FIG. 8 is a flow chart diagram illustrating one embodiment of a method 800 for indicating a beam failure detection reference signal. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes determining 802, at a user equipment, a first beam failure detection reference signal set and a second beam failure detection reference signal set for a serving cell. In some embodiments, the method 800 includes determining 804, at a physical layer in the user equipment, a radio link quality of reference signal resource configurations in each of the first beam failure detection reference signal set and the second beam failure detection reference signal set. In certain embodiments, the method 800 includes indicating 806, to a layer higher than the physical layer of the user equipment, an indication of a third beam failure detection reference signal set selected from a group comprising the first beam failure detection reference signal set and the second beam failure detection reference signal set in response to the radio link quality for all corresponding reference signal resource configurations in the third beam failure detection reference signal set being less than a threshold.

In certain embodiments, the method 800 further comprises: receiving configuration information comprising at least one reference signal resource configuration of the first beam failure detection reference signal set and the second beam failure detection reference signal set; and determining whether the first beam failure detection reference signal set or the second beam failure detection reference signal set corresponds to the at least one reference signal resource configuration based on the received configuration information. In some embodiments, the reference signal resource configurations in the first beam failure detection reference signal set and the second beam failure detection reference signal set comprise at least one synchronization signal block resource configuration or at least one periodic channel state information reference signal resource configuration. In various embodiments, reference signal resource configurations in the first beam failure detection reference signal set are quasi-collocated with demodulation reference signals of physical downlink control channel receptions monitored by the user equipment for a first set of control resource sets, a first set of search space sets, or a combination thereof, and reference signal resource configurations in the second beam failure detection reference signal set are quasi-collocated with demodulation reference signal of physical downlink control channel receptions monitored by the user equipment for a second set of control resource sets, a second set of search space sets, or a combination thereof.

In one embodiment, reference signal resource configurations in the first beam failure detection reference signal set are based on reference signals associated with a first set of activated transmission configuration indicator states for a physical downlink control channel that the user equipment uses for monitoring the physical downlink control channel, and reference signal resource configurations in the second beam failure detection reference signal set are based on reference signals associated with a second set of activated transmission configuration indicator states for the physical downlink control channel that the user equipment uses for monitoring the physical downlink control channel. In certain embodiments, the first set of activated transmission configuration indicator states for physical downlink control channel reception is associated with a first set of control resource sets, and the second set of activated transmission configuration indicator states for physical downlink control channel reception is associated with a second set of control resource sets. In some embodiments, the method 800 further comprises indicating the indication of the third beam failure detection reference signal set corresponding to the first beam failure detection reference signal set based on a first periodicity, and indicating the indication of the third beam failure detection reference signal set corresponding to the second beam failure detection reference signal set based on a second periodicity.

In various embodiments, the method 800 further comprises: configuring the layer higher than the physical layer with a first beam failure indication counter to count beam failure instance indications associated with the first beam failure detection reference signal set and a second beam failure indication counter to count beam failure instance indications associated with the second beam failure detection reference signal set; and incrementing the first beam failure indication counter or the second beam failure indication counter that is associated with the third beam failure detection reference signal set by one. In one embodiment, the method 800 further comprises receiving configuration information for a first beam failure detection timer value, a first beam failure instance maximum count value associated with the first beam failure detection reference signal set, a second beam failure detection timer value, a second beam failure instance maximum count value associated with the second beam failure detection reference signal set, or some combination thereof. In certain embodiments, the method 800 further comprises indicating, to a network device, a beam failure corresponding to the third beam failure detection reference signal set in response to a beam failure indication counter value that is associated with the third beam failure detection reference signal set being greater than or equal to a beam failure instance maximum count value.

In some embodiments, the method 800 further comprises: receiving configuration of a first candidate beam reference signal list associated with the first beam failure detection reference signal set and a second candidate beam reference signal list associated with the second beam failure detection reference signal set; and determining a candidate beam reference signal for recovery based on the first candidate beam reference signal list or the second candidate beam reference signal list, that is associated with the third beam failure detection reference signal set, wherein a layer 1 reference signal received power measurement of the candidate beam reference signal is greater than or equal to a reference signal received power threshold. In various embodiments, indicating the beam failure corresponding to the third beam failure detection reference signal set comprises transmitting a contention free random access preamble associated with the candidate beam reference signal. In one embodiment, indicating the beam failure corresponding to the third beam failure detection reference signal set comprises transmitting a medium access control control element on a physical uplink shared channel comprising an indication of the third beam failure detection reference signal set, an indication of the candidate beam reference signal associated with the third beam failure detection reference signal set, or a combination thereof for the serving cell.

In certain embodiments, the method 800 further comprises receiving a first configuration for a physical uplink control channel scheduling request transmission with a link recovery request associated with the first beam failure detection reference signal set, and a second configuration for physical uplink control channel scheduling request transmission with a link recovery request associated with the second beam failure detection reference signal set, wherein indicating the beam failure corresponding to the third beam failure detection reference signal set comprises transmitting the physical uplink control channel scheduling request associated with the third beam failure detection reference signal set. In some embodiments, the method 800 further comprises receiving a first configuration for a physical uplink control channel scheduling request transmission with a link recovery request associated with the first beam failure detection reference signal set, and a second configuration for physical uplink control channel scheduling request transmission with a link recovery request associated with the second beam failure detection reference signal set, wherein indicating the beam failure corresponding to the third beam failure detection reference signal set comprises transmitting the physical uplink control channel scheduling request associated with a beam failure detection reference signal set other than the third beam failure detection reference signal set. In various embodiments, the threshold is a level at which a radio level link of the reference signal resource configuration in the third beam failure detection reference signal set cannot be reliably received and corresponds to a pre-determined block error rate of a hypothetical physical downlink control channel transmission.

In one embodiment, the first beam failure detection reference signal set is associated with a first transmission and reception point in the serving cell and the second beam failure detection reference signal set is associated with a second transmission and reception point in the serving cell. In certain embodiments, the method 800 further comprises: receiving a scheduling assignment on a first physical downlink control channel of the physical downlink control channel receptions monitored by the user equipment for the first set of control resource sets; receiving a repetition of the scheduling assignment on a second physical downlink control channel of the physical downlink control channel receptions monitored by the user equipment for the second set of control resource sets; and determining the scheduling assignment based on the first physical downlink control channel and the second physical downlink control channel. In some embodiments, the physical uplink shared channel is a first physical uplink shared channel, and the method further comprises: receiving a scheduling assignment on a physical downlink control channel scheduling a physical uplink shared channel transmission with a same hybrid automatic repeat request process number as the transmission of the first physical uplink shared channel and having a toggled new data indicator field value; and monitoring physical downlink control channel receptions for a set of control resource sets associated with the third beam failure detection reference signal set for the serving cell using antenna port quasi co-location parameters that are the same as the ones associated with the candidate beam reference signal.

In one embodiment, a method comprises: determining, at a user equipment, a first beam failure detection reference signal set and a second beam failure detection reference signal set for a serving cell; determining, at a physical layer in the user equipment, a radio link quality of reference signal resource configurations in each of the first beam failure detection reference signal set and the second beam failure detection reference signal set; and indicating, to a layer higher than the physical layer of the user equipment, an indication of a third beam failure detection reference signal set selected from a group comprising the first beam failure detection reference signal set and the second beam failure detection reference signal set in response to the radio link quality for all corresponding reference signal resource configurations in the third beam failure detection reference signal set being less than a threshold.

In certain embodiments, the method further comprises: receiving configuration information comprising at least one reference signal resource configuration of the first beam failure detection reference signal set and the second beam failure detection reference signal set; and determining whether the first beam failure detection reference signal set or the second beam failure detection reference signal set corresponds to the at least one reference signal resource configuration based on the received configuration information.

In some embodiments, the reference signal resource configurations in the first beam failure detection reference signal set and the second beam failure detection reference signal set comprise at least one synchronization signal block resource configuration or at least one periodic channel state information reference signal resource configuration.

In various embodiments, reference signal resource configurations in the first beam failure detection reference signal set are quasi-collocated with demodulation reference signals of physical downlink control channel receptions monitored by the user equipment for a first set of control resource sets, a first set of search space sets, or a combination thereof, and reference signal resource configurations in the second beam failure detection reference signal set are quasi-collocated with demodulation reference signal of physical downlink control channel receptions monitored by the user equipment for a second set of control resource sets, a second set of search space sets, or a combination thereof.

In one embodiment, reference signal resource configurations in the first beam failure detection reference signal set are based on reference signals associated with a first set of activated transmission configuration indicator states for a physical downlink control channel that the user equipment uses for monitoring the physical downlink control channel, and reference signal resource configurations in the second beam failure detection reference signal set are based on reference signals associated with a second set of activated transmission configuration indicator states for the physical downlink control channel that the user equipment uses for monitoring the physical downlink control channel.

In certain embodiments, the first set of activated transmission configuration indicator states for physical downlink control channel reception is associated with a first set of control resource sets, and the second set of activated transmission configuration indicator states for physical downlink control channel reception is associated with a second set of control resource sets.

In some embodiments, the method further comprises indicating the indication of the third beam failure detection reference signal set corresponding to the first beam failure detection reference signal set based on a first periodicity, and indicating the indication of the third beam failure detection reference signal set corresponding to the second beam failure detection reference signal set based on a second periodicity.

In various embodiments, the method further comprises: configuring the layer higher than the physical layer with a first beam failure indication counter to count beam failure instance indications associated with the first beam failure detection reference signal set and a second beam failure indication counter to count beam failure instance indications associated with the second beam failure detection reference signal set; and incrementing the first beam failure indication counter or the second beam failure indication counter that is associated with the third beam failure detection reference signal set by one.

In one embodiment, the method further comprises receiving configuration information for a first beam failure detection timer value, a first beam failure instance maximum count value associated with the first beam failure detection reference signal set, a second beam failure detection timer value, a second beam failure instance maximum count value associated with the second beam failure detection reference signal set, or some combination thereof.

In certain embodiments, the method further comprises indicating, to a network device, a beam failure corresponding to the third beam failure detection reference signal set in response to a beam failure indication counter value that is associated with the third beam failure detection reference signal set being greater than or equal to a beam failure instance maximum count value.

In some embodiments, the method further comprises: receiving configuration of a first candidate beam reference signal list associated with the first beam failure detection reference signal set and a second candidate beam reference signal list associated with the second beam failure detection reference signal set; and determining a candidate beam reference signal for recovery based on the first candidate beam reference signal list or the second candidate beam reference signal list, that is associated with the third beam failure detection reference signal set, wherein a layer 1 reference signal received power measurement of the candidate beam reference signal is greater than or equal to a reference signal received power threshold.

In various embodiments, indicating the beam failure corresponding to the third beam failure detection reference signal set comprises transmitting a contention free random access preamble associated with the candidate beam reference signal.

In one embodiment, indicating the beam failure corresponding to the third beam failure detection reference signal set comprises transmitting a medium access control control element on a physical uplink shared channel comprising an indication of the third beam failure detection reference signal set, an indication of the candidate beam reference signal associated with the third beam failure detection reference signal set, or a combination thereof for the serving cell.

In certain embodiments, the method further comprises receiving a first configuration for a physical uplink control channel scheduling request transmission with a link recovery request associated with the first beam failure detection reference signal set, and a second configuration for physical uplink control channel scheduling request transmission with a link recovery request associated with the second beam failure detection reference signal set, wherein indicating the beam failure corresponding to the third beam failure detection reference signal set comprises transmitting the physical uplink control channel scheduling request associated with the third beam failure detection reference signal set.

In some embodiments, the method further comprises receiving a first configuration for a physical uplink control channel scheduling request transmission with a link recovery request associated with the first beam failure detection reference signal set, and a second configuration for physical uplink control channel scheduling request transmission with a link recovery request associated with the second beam failure detection reference signal set, wherein indicating the beam failure corresponding to the third beam failure detection reference signal set comprises transmitting the physical uplink control channel scheduling request associated with a beam failure detection reference signal set other than the third beam failure detection reference signal set.

In various embodiments, the threshold is a level at which a radio level link of the reference signal resource configuration in the third beam failure detection reference signal set cannot be reliably received and corresponds to a pre-determined block error rate of a hypothetical physical downlink control channel transmission.

In one embodiment, the first beam failure detection reference signal set is associated with a first transmission and reception point in the serving cell and the second beam failure detection reference signal set is associated with a second transmission and reception point in the serving cell.

In certain embodiments, the method further comprises: receiving a scheduling assignment on a first physical downlink control channel of the physical downlink control channel receptions monitored by the user equipment for the first set of control resource sets; receiving a repetition of the scheduling assignment on a second physical downlink control channel of the physical downlink control channel receptions monitored by the user equipment for the second set of control resource sets; and determining the scheduling assignment based on the first physical downlink control channel and the second physical downlink control channel.

In some embodiments, the physical uplink shared channel is a first physical uplink shared channel, and the method further comprises: receiving a scheduling assignment on a physical downlink control channel scheduling a physical uplink shared channel transmission with a same hybrid automatic repeat request process number as the transmission of the first physical uplink shared channel and having a toggled new data indicator field value; and monitoring physical downlink control channel receptions for a set of control resource sets associated with the third beam failure detection reference signal set for the serving cell using antenna port quasi co-location parameters that are the same as the ones associated with the candidate beam reference signal.

In one embodiment, an apparatus comprises a user equipment, the apparatus further comprises: a processor that: determines a first beam failure detection reference signal set and a second beam failure detection reference signal set for a serving cell; determines, at a physical layer in the user equipment, a radio link quality of reference signal resource configurations in each of the first beam failure detection reference signal set and the second beam failure detection reference signal set; and indicates, to a layer higher than the physical layer of the user equipment, an indication of a third beam failure detection reference signal set selected from a group comprising the first beam failure detection reference signal set and the second beam failure detection reference signal set in response to the radio link quality for all corresponding reference signal resource configurations in the third beam failure detection reference signal set being less than a threshold.

In certain embodiments, the apparatus further comprises a receiver that receives configuration information comprising at least one reference signal resource configuration of the first beam failure detection reference signal set and the second beam failure detection reference signal set, wherein the processor determines whether the first beam failure detection reference signal set or the second beam failure detection reference signal set corresponds to the at least one reference signal resource configuration based on the received configuration information.

In some embodiments, the reference signal resource configurations in the first beam failure detection reference signal set and the second beam failure detection reference signal set comprise at least one synchronization signal block resource configuration or at least one periodic channel state information reference signal resource configuration.

In various embodiments, reference signal resource configurations in the first beam failure detection reference signal set are quasi-collocated with demodulation reference signals of physical downlink control channel receptions monitored by the user equipment for a first set of control resource sets, a first set of search space sets, or a combination thereof, and reference signal resource configurations in the second beam failure detection reference signal set are quasi-collocated with demodulation reference signal of physical downlink control channel receptions monitored by the user equipment for a second set of control resource sets, a second set of search space sets, or a combination thereof.

In one embodiment, reference signal resource configurations in the first beam failure detection reference signal set are based on reference signals associated with a first set of activated transmission configuration indicator states for a physical downlink control channel that the user equipment uses for monitoring the physical downlink control channel, and reference signal resource configurations in the second beam failure detection reference signal set are based on reference signals associated with a second set of activated transmission configuration indicator states for the physical downlink control channel that the user equipment uses for monitoring the physical downlink control channel.

In certain embodiments, the first set of activated transmission configuration indicator states for physical downlink control channel reception is associated with a first set of control resource sets, and the second set of activated transmission configuration indicator states for physical downlink control channel reception is associated with a second set of control resource sets.

In some embodiments, the processor indicates the indication of the third beam failure detection reference signal set corresponding to the first beam failure detection reference signal set based on a first periodicity, and indicates the indication of the third beam failure detection reference signal set corresponding to the second beam failure detection reference signal set based on a second periodicity.

In various embodiments, the processor: configures the layer higher than the physical layer with a first beam failure indication counter to count beam failure instance indications associated with the first beam failure detection reference signal set and a second beam failure indication counter to count beam failure instance indications associated with the second beam failure detection reference signal set; and increments the first beam failure indication counter or the second beam failure indication counter that is associated with the third beam failure detection reference signal set by one.

In one embodiment, the method further comprises a receiver that receives configuration information for a first beam failure detection timer value, a first beam failure instance maximum count value associated with the first beam failure detection reference signal set, a second beam failure detection timer value, a second beam failure instance maximum count value associated with the second beam failure detection reference signal set, or some combination thereof.

In certain embodiments, the processor indicates, to a network device, a beam failure corresponding to the third beam failure detection reference signal set in response to a beam failure indication counter value that is associated with the third beam failure detection reference signal set being greater than or equal to a beam failure instance maximum count value.

In some embodiments, the apparatus further comprises a receiver that receives configuration of a first candidate beam reference signal list associated with the first beam failure detection reference signal set and a second candidate beam reference signal list associated with the second beam failure detection reference signal set, wherein the processor determines a candidate beam reference signal for recovery based on the first candidate beam reference signal list or the second candidate beam reference signal list, that is associated with the third beam failure detection reference signal set, wherein a layer 1 reference signal received power measurement of the candidate beam reference signal is greater than or equal to a reference signal received power threshold.

In various embodiments, indicating the beam failure corresponding to the third beam failure detection reference signal set comprises transmitting a contention free random access preamble associated with the candidate beam reference signal.

In one embodiment, indicating the beam failure corresponding to the third beam failure detection reference signal set comprises transmitting a medium access control control element on a physical uplink shared channel comprising an indication of the third beam failure detection reference signal set, an indication of the candidate beam reference signal associated with the third beam failure detection reference signal set, or a combination thereof for the serving cell.

In certain embodiments, the apparatus further comprises a receiver that receives a first configuration for a physical uplink control channel scheduling request transmission with a link recovery request associated with the first beam failure detection reference signal set, and a second configuration for physical uplink control channel scheduling request transmission with a link recovery request associated with the second beam failure detection reference signal set, wherein indicating the beam failure corresponding to the third beam failure detection reference signal set comprises transmitting the physical uplink control channel scheduling request associated with the third beam failure detection reference signal set.

In some embodiments, the apparatus further comprises a receiver that receives a first configuration for a physical uplink control channel scheduling request transmission with a link recovery request associated with the first beam failure detection reference signal set, and a second configuration for physical uplink control channel scheduling request transmission with a link recovery request associated with the second beam failure detection reference signal set, wherein indicating the beam failure corresponding to the third beam failure detection reference signal set comprises transmitting the physical uplink control channel scheduling request associated with a beam failure detection reference signal set other than the third beam failure detection reference signal set.

In various embodiments, the threshold is a level at which a radio level link of the reference signal resource configuration in the third beam failure detection reference signal set cannot be reliably received and corresponds to a pre-determined block error rate of a hypothetical physical downlink control channel transmission.

In one embodiment, the first beam failure detection reference signal set is associated with a first transmission and reception point in the serving cell and the second beam failure detection reference signal set is associated with a second transmission and reception point in the serving cell.

In certain embodiments, the apparatus further comprises a receiver that: receives a scheduling assignment on a first physical downlink control channel of the physical downlink control channel receptions monitored by the user equipment for the first set of control resource sets; and receives a repetition of the scheduling assignment on a second physical downlink control channel of the physical downlink control channel receptions monitored by the user equipment for the second set of control resource sets, wherein the processor determines the scheduling assignment based on the first physical downlink control channel and the second physical downlink control channel.

In some embodiments, the physical uplink shared channel is a first physical uplink shared channel, and the apparatus further comprises a receiver that receives a scheduling assignment on a physical downlink control channel scheduling a physical uplink shared channel transmission with a same hybrid automatic repeat request process number as the transmission of the first physical uplink shared channel and having a toggled new data indicator field value, wherein the processor monitors physical downlink control channel receptions for a set of control resource sets associated with the third beam failure detection reference signal set for the serving cell using antenna port quasi co-location parameters that are the same as the ones associated with the candidate beam reference signal.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
determining, at a user equipment, a first beam failure detection reference signal set and a second beam failure detection reference signal set for a serving cell;
determining, at a physical layer in the user equipment, a radio link quality of reference signal resource configurations in each of the first beam failure detection reference signal set and the second beam failure detection reference signal set; and
indicating, to a layer higher than the physical layer of the user equipment, an indication of a third beam failure detection reference signal set selected from a group comprising the first beam failure detection reference signal set and the second beam failure detection reference signal set in response to the radio link quality for all corresponding reference signal resource configurations in the third beam failure detection reference signal set being less than a threshold.

2. The method of claim 1, further comprising:
receiving configuration information comprising at least one reference signal resource configuration of the first beam failure detection reference signal set and the second beam failure detection reference signal set; and
determining whether the first beam failure detection reference signal set or the second beam failure detection reference signal set corresponds to the at least one reference signal resource configuration based on the received configuration information.

3. The method of claim 1, wherein the reference signal resource configurations in the first beam failure detection reference signal set and the second beam failure detection reference signal set comprise at least one synchronization signal block resource configuration or at least one periodic channel state information reference signal resource configuration.

4. The method of claim 1, wherein reference signal resource configurations in the first beam failure detection reference signal set are quasi-collocated with demodulation reference signals of physical downlink control channel receptions monitored by the user equipment for a first set of control resource sets, a first set of search space sets, or a combination thereof, and reference signal resource configurations in the second beam failure detection reference signal set are quasi-collocated with demodulation reference signal of physical downlink control channel receptions monitored by the user equipment for a second set of control resource sets, a second set of search space sets, or a combination thereof.

5. The method of claim 1, wherein reference signal resource configurations in the first beam failure detection reference signal set are based on reference signals associated with a first set of activated transmission configuration indicator states for a physical downlink control channel that the user equipment uses for monitoring the physical downlink control channel, and reference signal resource configurations in the second beam failure detection reference signal set are based on reference signals associated with a second set of activated transmission configuration indicator states for the physical downlink control channel that the user equipment uses for monitoring the physical downlink control channel.

6. The method of claim 5, wherein the first set of activated transmission configuration indicator states for physical downlink control channel reception is associated with a first set of control resource sets, and the second set of activated transmission configuration indicator states for physical downlink control channel reception is associated with a second set of control resource sets.

7. The method of claim 1, further comprising indicating the indication of the third beam failure detection reference signal set corresponding to the first beam failure detection reference signal set based on a first periodicity, and indicating the indication of the third beam failure detection reference signal set corresponding to the second beam failure detection reference signal set based on a second periodicity.

8. The method of claim 1, further comprising:
configuring the layer higher than the physical layer with a first beam failure indication counter to count beam failure instance indications associated with the first beam failure detection reference signal set and a second beam failure indication counter to count beam failure instance indications associated with the second beam failure detection reference signal set; and
incrementing the first beam failure indication counter or the second beam failure indication counter that is associated with the third beam failure detection reference signal set by one.

9. The method of claim 1, further comprising receiving configuration information for a first beam failure detection timer value, a first beam failure instance maximum count value associated with the first beam failure detection reference signal set, a second beam failure detection timer value, a second beam failure instance maximum count value associated with the second beam failure detection reference signal set, or some combination thereof.

10. The method of claim 1, further comprising indicating, to a network device, a beam failure corresponding to the third beam failure detection reference signal set in response to a beam failure indication counter value that is associated with the third beam failure detection reference signal set being greater than or equal to a beam failure instance maximum count value.

11. The method of claim 10, further comprising:
receiving configuration of a first candidate beam reference signal list associated with the first beam failure detection reference signal set and a second candidate beam reference signal list associated with the second beam failure detection reference signal set; and
determining a candidate beam reference signal for recovery based on the first candidate beam reference signal list or the second candidate beam reference signal list, that is associated with the third beam failure detection reference signal set, wherein a layer 1 reference signal received power measurement of the candidate beam reference signal is greater than or equal to a reference signal received power threshold.

12. The method of claim 11, wherein indicating the beam failure corresponding to the third beam failure detection reference signal set comprises transmitting a contention free random access preamble associated with the candidate beam reference signal.

13. The method of claim 11, wherein indicating the beam failure corresponding to the third beam failure detection reference signal set comprises transmitting a medium access control control element on a physical uplink shared channel comprising an indication of the third beam failure detection reference signal set, an indication of the candidate beam reference signal associated with the third beam failure detection reference signal set, or a combination thereof for the serving cell.

14. The method of claim 10, further comprising receiving a first configuration for a physical uplink control channel scheduling request transmission with a link recovery request associated with the first beam failure detection reference signal set, and a second configuration for physical uplink control channel scheduling request transmission with a link recovery request associated with the second beam failure detection reference signal set, wherein indicating the beam failure corresponding to the third beam failure detection reference signal set comprises transmitting the physical uplink control channel scheduling request associated with the third beam failure detection reference signal set.

15. The method of claim 10, further comprising receiving a first configuration for a physical uplink control channel scheduling request transmission with a link recovery request associated with the first beam failure detection reference signal set, and a second configuration for physical uplink control channel scheduling request transmission with a link recovery request associated with the second beam failure detection reference signal set, wherein indicating the beam failure corresponding to the third beam failure detection reference signal set comprises transmitting the physical uplink control channel scheduling request associated with a beam failure detection reference signal set other than the third beam failure detection reference signal set.

16. The method of claim 1, wherein the threshold is a level at which a radio level link of the reference signal resource configuration in the third beam failure detection reference signal set cannot be reliably received and corresponds to a pre-determined block error rate of a hypothetical physical downlink control channel transmission.

17. The method of claim 1, wherein the first beam failure detection reference signal set is associated with a first transmission and reception point in the serving cell and the second beam failure detection reference signal set is associated with a second transmission and reception point in the serving cell.

18. The method of claim 4, further comprising:
receiving a scheduling assignment on a first physical downlink control channel of the physical downlink control channel receptions monitored by the user equipment for the first set of control resource sets;
receiving a repetition of the scheduling assignment on a second physical downlink control channel of the physical downlink control channel receptions monitored by the user equipment for the second set of control resource sets; and
determining the scheduling assignment based on the first physical downlink control channel and the second physical downlink control channel.

19. The method of claim 13, wherein the physical uplink shared channel is a first physical uplink shared channel, and the method further comprises:
receiving a scheduling assignment on a physical downlink control channel scheduling a physical uplink shared channel transmission with a same hybrid automatic repeat request process number as the transmission of the first physical uplink shared channel and having a toggled new data indicator field value; and
monitoring physical downlink control channel receptions for a set of control resource sets associated with the third beam failure detection reference signal set for the serving cell using antenna port quasi co-location parameters that are the same as the ones associated with the candidate beam reference signal.

20. An apparatus comprising a user equipment, the apparatus further comprising:

a processor that:
- determines a first beam failure detection reference signal set and a second beam failure detection reference signal set for a serving cell;
- determines, at a physical layer in the user equipment, a radio link quality of reference signal resource configurations in each of the first beam failure detection reference signal set and the second beam failure detection reference signal set; and
- indicates, to a layer higher than the physical layer of the user equipment, an indication of a third beam failure detection reference signal set selected from a group comprising the first beam failure detection reference signal set and the second beam failure detection reference signal set in response to the radio link quality for all corresponding reference signal resource configurations in the third beam failure detection reference signal set being less than a threshold.

* * * * *